Jan. 21, 1930.  W. J. MOORE  1,744,238
BODY MOLDING
Filed Aug. 11, 1928
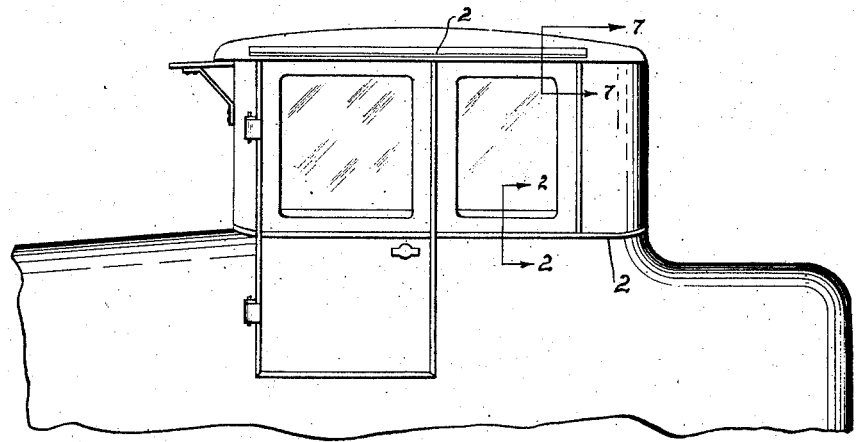
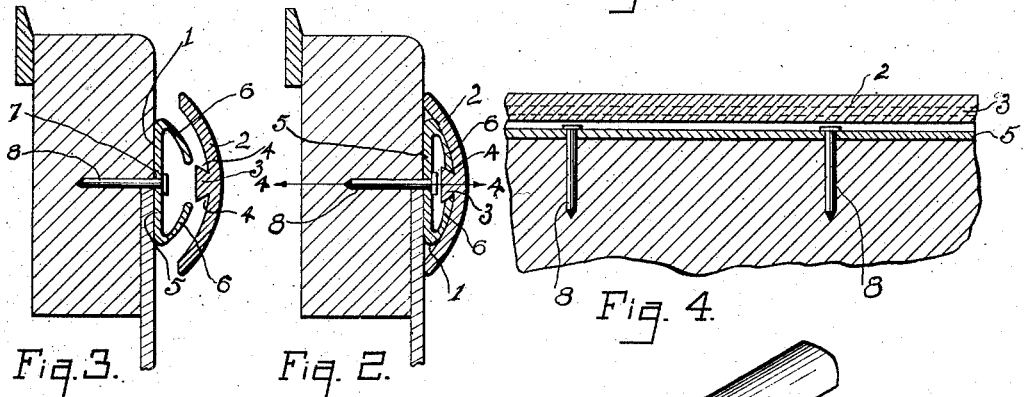
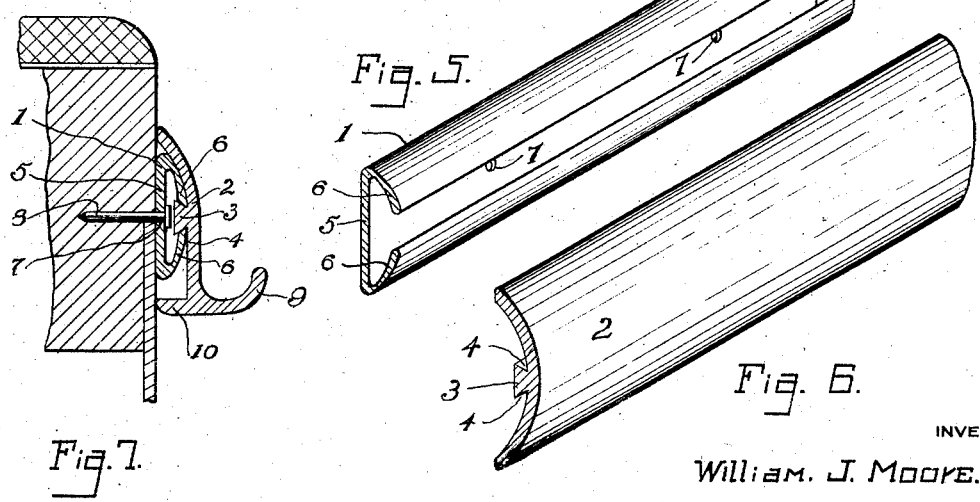
INVENTOR
William. J. Moore.
ATTORNEY Patented Jan. 21, 1930

1,744,238

UNITED STATES PATENT OFFICE

WILLIAM J. MOORE, OF DETROIT, MICHIGAN

BODY MOLDING

Application filed August 11, 1928. Serial No. 298,897.

This invention relates to a molding or finishing strip particularly adapted for use as a body molding on automobile bodies and to cover the joints between the panels or between the panels and framing of such bodies. It is also adapted for use as a drip molding in which case it is formed with a flange providing a channel to receve the drip from the roof of the automobile.

Moldings of this character to be applied to automobile bodies are so constructed as to conceal the fastening means by which they are secured to the surface of the body so that the molding will present a smooth unbroken surface which may be properly finished and will present a neat appearance.

An object of the present invention is to secure a construction whereby the molding may be very accurately positioned and secured in place with facility. It is also an object to provide a construction which is such that the same may be bent laterally to lie close and evenly against the curved surfaces of the automobile body, and further to provide for attaching the molding after the body has been given its finishing coat and will cover the edges of such coating and prevent cracking. A further object is to provide a molding which may be given a finishing coat and then applied to the body with the edges of the molding in firm contact with the body to make a tight joint therewith. A further object is to provide a securing strip for holding the molding and which strip may be accurately positioned and firmly secured to the body before the molding is applied thereto and when the molding is so applied it is firmly interlocked with the securing strip in such a manner as to preclude its becoming loosened in use. It is also an object to provide interlocking means for connecting the molding to the securing strip which locking means is so constructed as to insure a firm locking engagement and the molding may be applied with facility without danger of marring its outer surface.

With the above and other ends in view, the invention consists in the matters hereinafter set forth and more particularly pointed out in the appended claims, reference being had to the accompanying drawing, in which Figure 1 is a side elevation of an automobile body showing a finishing strip and drip molding in place thereon to illustrate the application of the present invention in use;

Figure 2 is an enlarged transverse section substantially upon the line 2—2 of Figure 1;

Figure 3 is an enlarged section similar to Figure 2, and showing the molding parts separated to illustrate the manner in which they are brought together into interlocking relation;

Figure 4 is a longitudinal section upon the line 4—4 of Figure 2;

Figure 5 is a perspective detail of a length of securing strip;

Figure 6 is a perspective detail of a length of molding strip, and

Figure 7 is a sectional detail similar to Figures 2 and 3 and showing the molding strip formed with a flange providing a drip trough.

While the molding illustrated in the accompanying drawing is particularly adapted for use in the finishing of automobile bodies it may, of course, be used in other places and upon other kinds of work. This molding comprises two parts, namely, a securing strip 1 which is of channel formation, and a molding strip 2 having the desired exterior configuration and preferably formed convexo concave in cross section. These strips are preferably formed of a comparatively soft pliable metal formed by the usual extruding method, the molding strip being formed with a longitudinal centrally positioned rib 3 projecting from the inner or concave side of the molding and the sides of this rib are undercut as at 4, thus providing a dove-tail formation.

The securing strip 1 has a flat base portion 5 with outstanding integral edge flanges 6, these flanges being bent inwardly of the strip toward each other and preferably curved in the direction of their width so that they will easily bend toward each other, and toward the base of the strip. Along the entire length of the strip adjacent the meeting line of the flanges and the edges of the base 5, these flanges are preferably thinned slightly so that they will more readily bend along these lines without distorting the base of the strip, and the base of the strip is provided with a series of holes 7 along the longitudinal center line of the base throughout its length to receive nails 8 or other members for firmly securing the strip to the surface of the body or other structure to which the molding is to be applied.

The molding is applied by first securing the strip 1 in place by nailing it firmly to the body and this operation may be carried out with facility and accuracy due to the form of this securing strip which is accurately made so that it may be secured in place along straight lines where such lines are desired and as the strip is comparatively thin in cross section it may be readily bent laterally to follow curved lines of the body and then secured in that position by the nails which are driven in through the openings 7 between the adjacent free edges of the flanges 6. After the strip 1 has been accurately placed and firmly secured to the body, the molding strip is then applied by inserting the dovetail rib 3 between the spaced apart edges of the flanges 6 and then by firm pressure and a careful hammering of the molding strip toward the securing strip, the bendable flanges 6 are caused to bend by coming in contact with the concave inner side of the molding strip and by such pressure the free edges of these flanges are forced firmly into the undercut sides of the rib 3, firmly interlocking with said rib throughout the entire length of the molding.

By this arrangement the bending of the flanges 6 in the proper direction to properly interlock with the dove-tail rib is insured and no great amount of force is required to so bring the parts into firm interlocking engagement. Therefore marring of the outer surface of the molding is precluded and the molding is held firmly in place with its outer surface presenting a smooth, even contour without waves or bends.

As the flanges 6 are folded inwardly or toward each other into interlocking engagement with the rib on the molding, the molding is firmly held in place with its edges firmly against the surface to which it is applied laterally of the edges of the securing strip which is entirely concealed by the molding strip. A close joint is formed between each edge of the molding and the surface to which it is applied and is secured in that position by the interlocking of the flanges 6 with the rib, these flanges bending readily into such engagement by reason of being curved in the direction of their width to conform to the curvature of the concave side of the molding and the bending of these flanges is further facilitated by their reduction in thickness adjacent the edges of the base 5 of the strip. The molding may, therefore, be applied to the securing strip with comparatively little force and when the parts are in firmly interlocked relation it is almost impossible to separate them due to the form of the interlock.

In the modified construction shown in Figure 7, the molding strip 2 is formed with an outstanding flange 9 along the lower edge portion thereof, said flange being curved upwardly to provide a drip trough and an oppositely or inwardly extending flange 10 is provided at the inner side of the trough to engage the surface of the structure to which the molding is applied.

The terms used in describing the present invention are to be interpreted in the light of the specification and to include the mechanical equivalents thereof and as changes may obviously be made in the construction and within the terms of the appended claims, I do not limit myself to the particular form of construction shown.

Having thus fully described my invention what I claim is:—

1. A finishing strip comprising a securing strip having a base and flanges curved upwardly and inwardly toward each other from the edges of said base and spaced apart at their adjacent edges, said base having openings to receive securing means; and a molding strip having a longitudinally extending undercut rib to be engaged by the opposed edges of the flanges on the securing strip, said edges being adapted to interlock with the undercut of the rib, and a flange extending on each side of said rib in curved form in cross section substantially concentric with the flanges of the securing strip and with their outer edges in a plane beyond the plane of the inner edge face of the rib, said flanges forming an arch and being of an extent to completely cover the securing strip and to rest on the surface of the body to which the finishing strip is attached and with said rib maintained out of contact with the securing means, the space within the area, except for the rib, being free.

2. A finishing strip comprising a securing strip having a base with flanges extending upwardly and inwardly towards each other from the edges of said base and spaced apart at their opposed edges, means for securing said strip to the surface to be finished, and a molding strip to overlie the securing strip and having an undercut rib to be interlockingly engaged by the edges of the convergent flanges of the securing strip, said molding strip having flanges extending laterally from said rib and terminating in a plane parallel with and beyond the plane of the inner face of said rib, and with the space within said flanges, except for the rib, being free, for bodily receiving said securing strip with its convergent flanges, said molding strip when pressed upon the securing strip deforming the flanges thereof to lock with the rib and its edges forming stops coming against the said surface to limit the deformation of the said convergent flanges of the securing strip, substantially as described.

In testimony whereof I affix my signature.

WILLIAM J. MOORE.